(12) United States Patent
Akkarakaran et al.

(10) Patent No.: US 11,653,321 B2
(45) Date of Patent: May 16, 2023

(54) METHODS AND APPARATUS TO FACILITATE BEAM-BASED SEQUENCE SPACES FOR SYNCHRONIZATION SIGNALS

(71) Applicant: QUALCOMM Incorporated, San Diego, CA (US)

(72) Inventors: Sony Akkarakaran, Poway, CA (US); Tao Luo, San Diego, CA (US); Junyi Li, Chester, NJ (US); Jung Ho Ryu, Fort Lee, NJ (US); Kapil Gulati, Hillsborough, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 16/923,029

(22) Filed: Jul. 7, 2020

(65) Prior Publication Data
US 2021/0014815 A1    Jan. 14, 2021

Related U.S. Application Data

(60) Provisional application No. 62/873,737, filed on Jul. 12, 2019.

(51) Int. Cl.
*H04W 56/00* (2009.01)
*H04W 48/08* (2009.01)

(52) U.S. Cl.
CPC ....... *H04W 56/0015* (2013.01); *H04W 48/08* (2013.01)

(58) Field of Classification Search
CPC . H04W 56/0015; H04W 48/08; H04W 24/10; H04W 72/14; H04W 74/0808;
(Continued)

(56) References Cited

U.S. PATENT DOCUMENTS 11,271,699 B1 * 3/2022 Eyuboglu ............ H04B 7/0691
2016/0142241 A1 * 5/2016 Sahlin ................. H04L 27/2656
370/329
(Continued)

FOREIGN PATENT DOCUMENTS

EP        2871894 B1 *  9/2018  ........... H04L 5/0053
WO  WO-2015081993 A1 *  6/2015  ............ H04B 7/068
(Continued)

OTHER PUBLICATIONS

Ericsson, Details of SS beam reporting framework, R1-1718744, 3GPP TSG RAN WG1 Meeting 90bis Prague, CZ, Oct. 9-13, 2017, from here on Ericsson. (Year: 2017).*
(Continued)

*Primary Examiner* — Ayaz R Sheikh
*Assistant Examiner* — Louis Samara
(74) *Attorney, Agent, or Firm* — Procopio, Cory, Hargreaves & Savitch LLP

(57) ABSTRACT

Apparatus, methods, and computer-readable media for facilitating beam-based sequence spaces for synchronization signals are disclosed herein. An example method for wireless communication for a first device includes selecting a subset of synchronization signal block (SSB) occasions including SSB occasions within an SSB period, and wherein the subset of SSB occasions is associated with a pairing of a primary synchronization signal (PSS) and a secondary synchronization signal (SSS). The example method also includes transmitting an SSB using at least one SSB occasion from the subset of SSB occasions. An example method for wireless communication for a user equipment (UE) includes selecting a synchronization signal pairing associated with a pairing of a PSS and a SSS, wherein the synchronization signal pairing maps to a subset of SSB occasions including SSB occasions within an SSB period,
(Continued)

and also includes monitoring for an SSB at each SSB occasion from the subset of SSB occasions.

30 Claims, 12 Drawing Sheets

(58) Field of Classification Search
CPC ............ H04W 74/0833; H04W 74/08; H04W 74/004; H04L 27/26025; H04L 5/005; H04L 5/0053; H04B 7/0617; H04B 7/088; H04B 7/068; H04B 7/0639; H04B 7/0413; H04B 7/08; H04B 7/0691; H04J 11/0069
See application file for complete search history.

(56) References Cited

U.S. PATENT DOCUMENTS

| | | | |
|---|---|---|---|
| 2018/0091196 A1* | 3/2018 | Frenne | H04L 5/005 |
| 2018/0220450 A1* | 8/2018 | Aiba | H04W 74/004 |
| 2018/0279380 A1* | 9/2018 | Jung | H04W 74/0833 |
| 2018/0368189 A1* | 12/2018 | Narasimha | H04W 56/001 |
| 2019/0123803 A1* | 4/2019 | Raghavan | H04B 7/0639 |
| 2019/0159226 A1 | 5/2019 | Ly et al. | |
| 2019/0387546 A1* | 12/2019 | Li | H04L 27/26132 |
| 2020/0280942 A1* | 9/2020 | Jung | H04J 11/0069 |
| 2020/0389847 A1* | 12/2020 | Deng | H04W 52/0219 |
| 2021/0112596 A1* | 4/2021 | Park | H04L 5/005 |
| 2021/0168858 A1* | 6/2021 | Liu | H04L 27/26 |
| 2021/0235492 A1* | 7/2021 | Iyer | H04W 72/0453 |
| 2021/0258066 A1* | 8/2021 | Yu | H04W 24/10 |
| 2021/0289536 A1* | 9/2021 | Liu | H04L 5/0091 |
| 2021/0315026 A1* | 10/2021 | Jung | H04W 74/0808 |

FOREIGN PATENT DOCUMENTS

| | | | | |
|---|---|---|---|---|
| WO | WO-2018021867 A1 * | 2/2018 | ............... | H04B 7/08 |
| WO | 2019047228 A1 | 3/2019 | | |
| WO | WO-2019047228 A1 * | 3/2019 | ............. | H04L 5/005 |
| WO | WO-2019156085 A1 * | 8/2019 | ........... | H04B 7/0413 |

OTHER PUBLICATIONS

Qualcomm, SS block, burst-set composition, and time index indication, R1-1705565, 3GPP TSG-RAN WG1#88bis, Apr. 3-7, 2017, agenda item 8.1.1.1.2. (Year: 2017).*
Ericsson: "Details of SS Beam Reporting Framework", 3GPP TSG RAN WG1 Meeting 90bis, 3GPP Draft, R1-1718744, 3rd Generation Partnership Project (3GPP), Mobile Competence Centre, 650, Route Des Lucioles, F-06921 Sophia-Antipolis Cedex, France, vol. RAN WG1, No. Prague, CZ, Oct. 9, 2017-Oct. 13, 2017, 4 Pages, Oct. 8, 2017 (Oct. 8, 2017), XP051341914, Retrieved from the Internet URL: http://www.3gpp.org/ftp/Meetings_3GPP_SYNC/RAN1/Docs [retrieved on Oct. 8, 2017] Chapters 1, 2, figure 1, p. 2, paragraph 1.
International Search Report and Written Opinion—PCT/US2020/041291—ISA/EPO—dated Oct. 1, 2020.
Qualcomm Incorporated: "SS Block, Burst-Set Composition, and Time Index Indication", 3GPP Draft, 3GPP TSG-RAN WG1 NR#88bis, R1-1705565, 3rd Generation Partnership Project (3GPP), Mobile Competence Centre, 650, Route Des Lucioles, F-06921, Sophia-Antipolis Cedex, France, vol. RAN WG1, No. Spokane, USA, Apr. 3, 2017-Apr. 7, 2017, 10 Pages, Apr. 2, 2017, XP051243693, Retrieved from the Internet: URL: http://www.3gpp.org/ftp/Meetings_3GPP_SYNC/RAN1/Docs/ [retrieved on Apr. 2, 2017] (p. 2 to 6) p. 3, paragraph 2, figure 1.

* cited by examiner

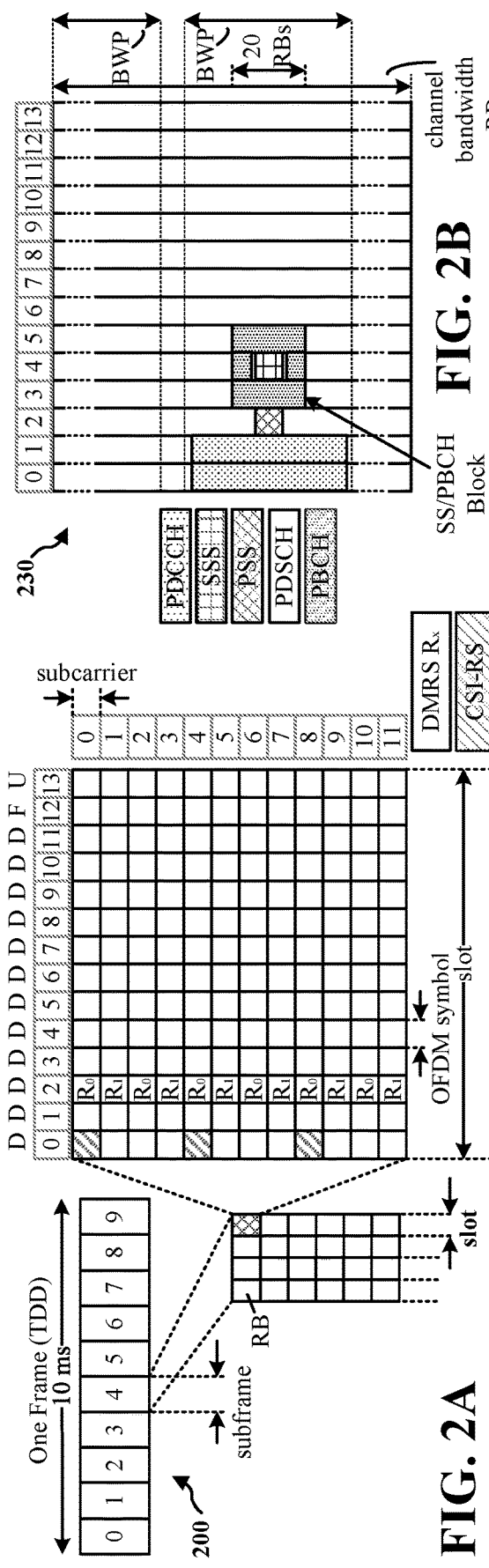
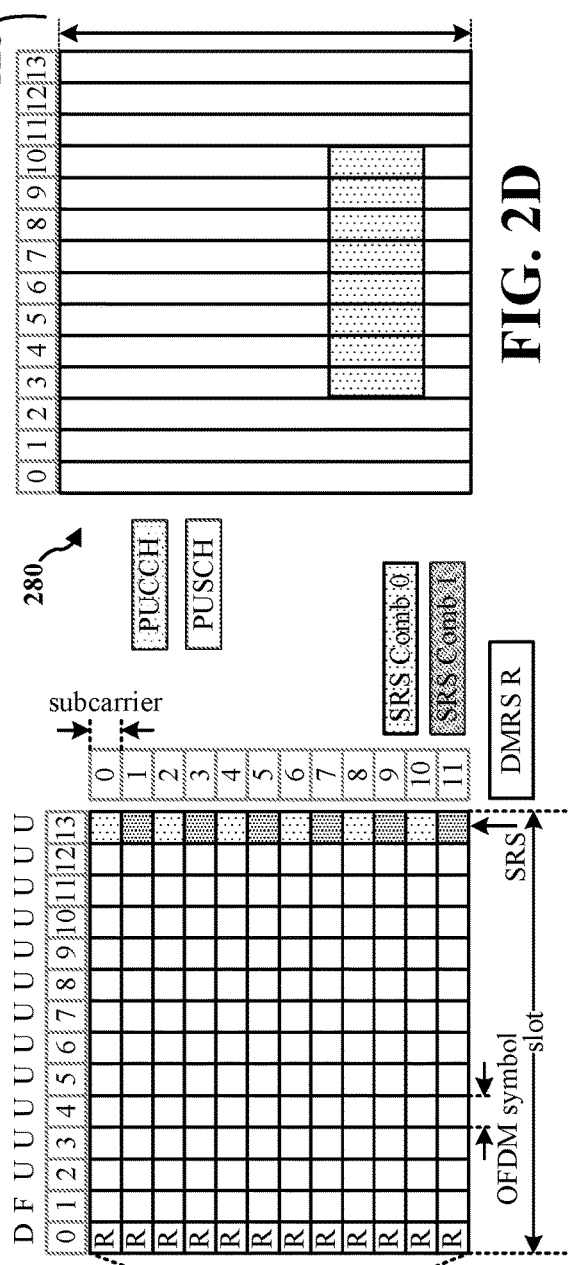
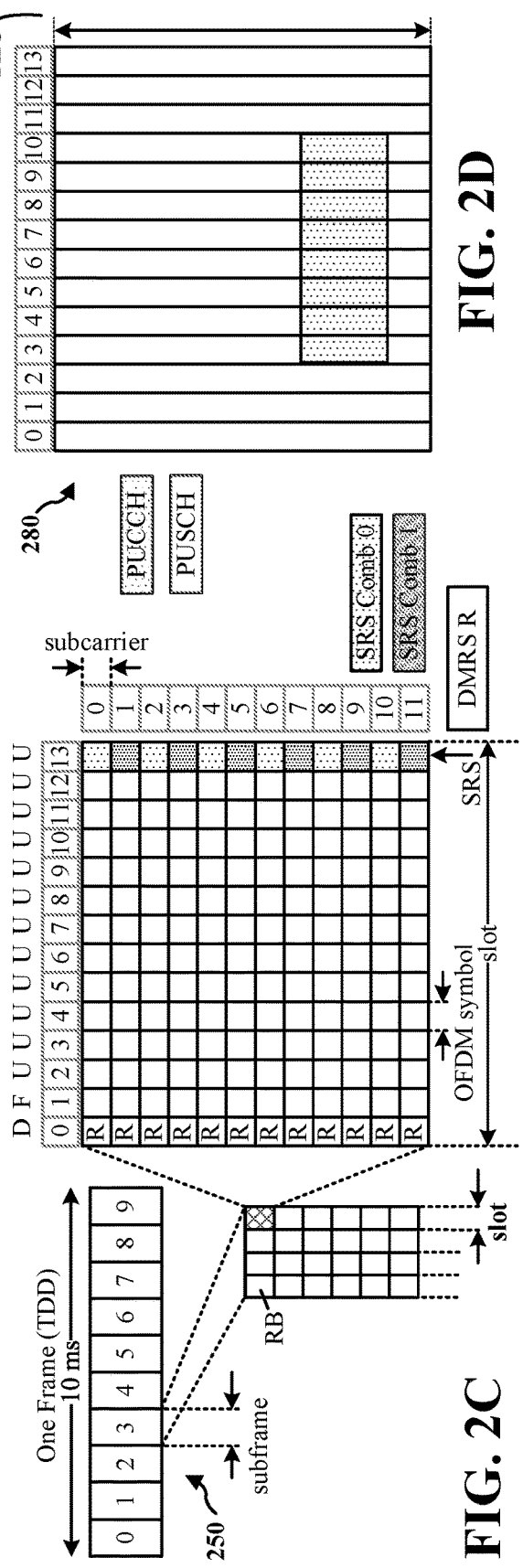

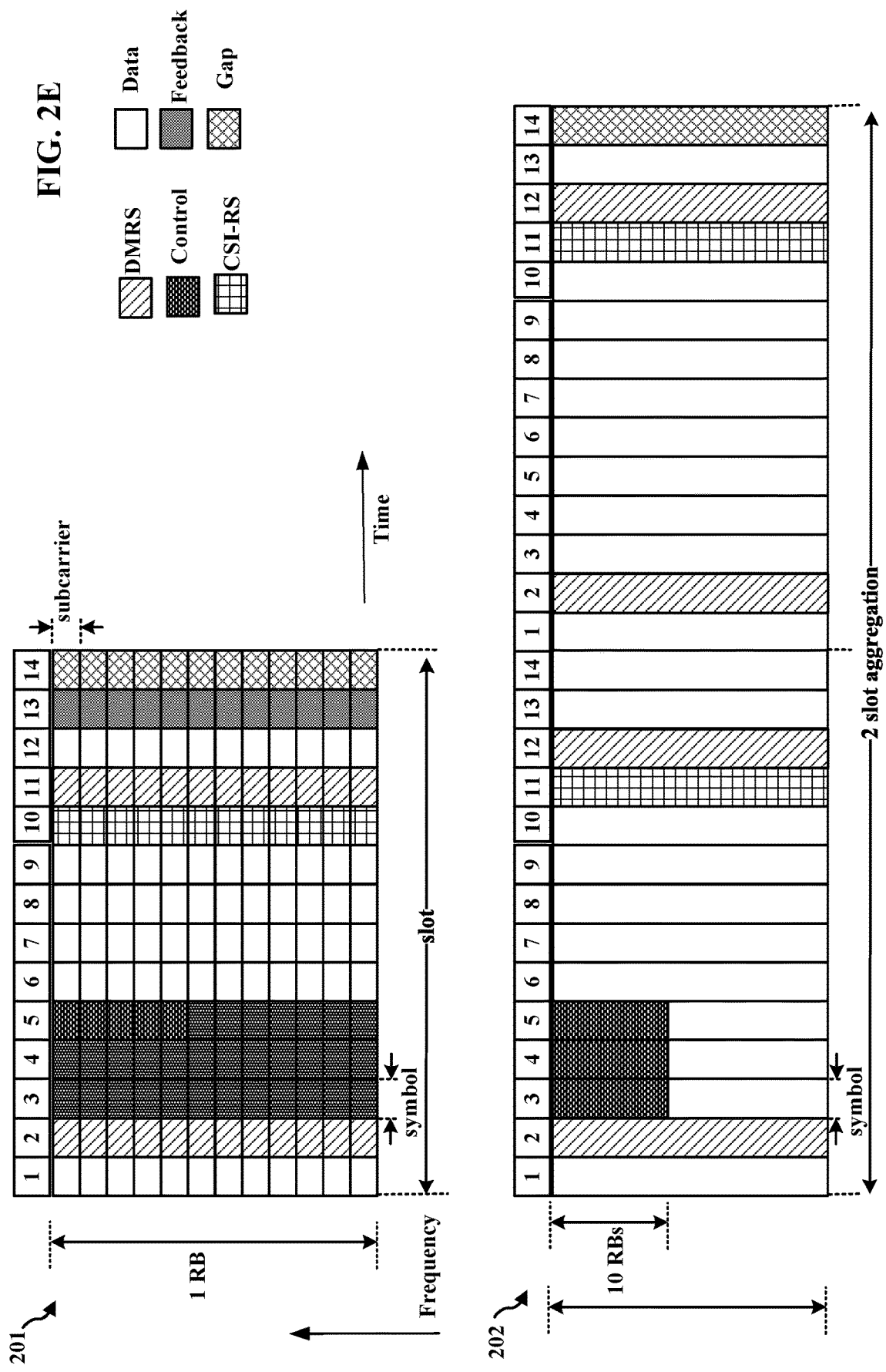

METHODS AND APPARATUS TO FACILITATE BEAM-BASED SEQUENCE SPACES FOR SYNCHRONIZATION SIGNALS

CROSS REFERENCE TO RELATED APPLICATION(S)

This application claims the benefit of U.S. Provisional Application Ser. No. 62/873,737, entitled "METHODS AND APPARATUS TO FACILITATE BEAM-BASED SEQUENCE SPACES FOR SYNCHRONIZATION SIGNALS" and filed on Jul. 12, 2019, which is expressly incorporated by reference herein in its entirety.

BACKGROUND

Technical Field

The present disclosure relates generally to communication systems, and more particularly, to synchronization signals.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Aspects of wireless communication may comprise direct communication between devices, such as in vehicle-to-vehicle (V2V), vehicle-to-everything (V2X), or other device-to-device (D2D) technology. There exists a need for further improvements in wireless communication technology. These improvements may also be applicable to multiple radio access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A user equipment (UE) trying to access a communication network may follow a cell search procedure that may include a series of synchronization stages. In some examples, the synchronization stages may enable the UE to determine time and/or frequency parameters that may be useful for demodulating downlink signals, transmitting with the correct timing, and/or acquiring system parameters. Synchronization signal blocks (SSBs) may include a primary synchronization signal (PSS), a secondary synchronization signal (SSS), and a physical broadcast channel (PBCH). The PSS may be used by the UE to determine symbol timing (e.g., OFDM symbol boundaries) and a physical layer identity. The SSS may be used by the UE to determine a physical layer cell identity group number (e.g., a "cell identifier") and radio frame timing. The PBCH may carry a master information block (MIB), which may provide a number of resource blocks in the system bandwidth and a system frame number.

The SSBs may be transmitted (e.g., by a base station for communication over an access link or by a UE for communication over sidelink) at predetermined locations (e.g., time locations) within an SSB period, and the maximum number of SSBs may depend on the frequency band. In some examples, each SSB may be transmitted on a different beam, and the UE may search for all of the SSBs until the UE identifies a suitable SSB (e.g., an SSB associated with a satisfactory measurement).

However, while the locations of the SSBs are predetermined, the base station or transmitting UE may transmit only a subset of the SSBs. In some examples, it may be beneficial for the UE monitoring for SSBs to determine how many SSBs were actually transmitted. However, in some examples, the UE may not be able to determine how many SSBs were actually transmitted by a base station until, for example, the UE is able to acquire the symbol timing information from the PSS, acquire the cell identifier from the SSS, decode the MIB that is encoded in the PBCH, and then read the system information block (SIB) (e.g., SIB 1) that indicates how many SSBs are transmitted.

Example techniques disclosed herein facilitate a more efficient way for a UE to perform initial searches for SSBs via an earlier indicator. Furthermore, example techniques disclosed herein facilitate providing beam-related information via the earlier indicator. In some examples, the disclosed techniques may be utilized for establishing an access link connection (e.g., between a base station and a UE). In some examples, the disclosed techniques may be utilized for establishing a sidelink connection (e.g., between a UE and another UE).

In an aspect of the disclosure, a method, a computer-readable medium, and an apparatus are provided. An example apparatus for wireless communication for a first device selects a subset of synchronization signal block (SSB) occasions including SSB occasions within an SSB period. In some examples, the subset of SSB occasions may be associated with a pairing of a primary synchronization signal (PSS) and a secondary synchronization signal (SSS). Furthermore, the example apparatus transmits an SSB using at least one SSB occasion from the subset of SSB occasions.

In another aspect of the disclosure, a method, a computer-readable medium, and an apparatus are provided. An example apparatus for wireless communication for a UE selects a synchronization signal pairing. In some examples, the synchronization signal pairing may be associated with a pairing of a PSS and an SSS. In some examples, the synchronization signal pairing may map to a subset of SSB occasions including SSB occasions within an SSB period. The example apparatus also monitors for an SSB at each SSB occasion from the subset of SSB occasions.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2E illustrates example aspects of a sidelink slot structure.

DETAILED DESCRIPTION

Figure 1:
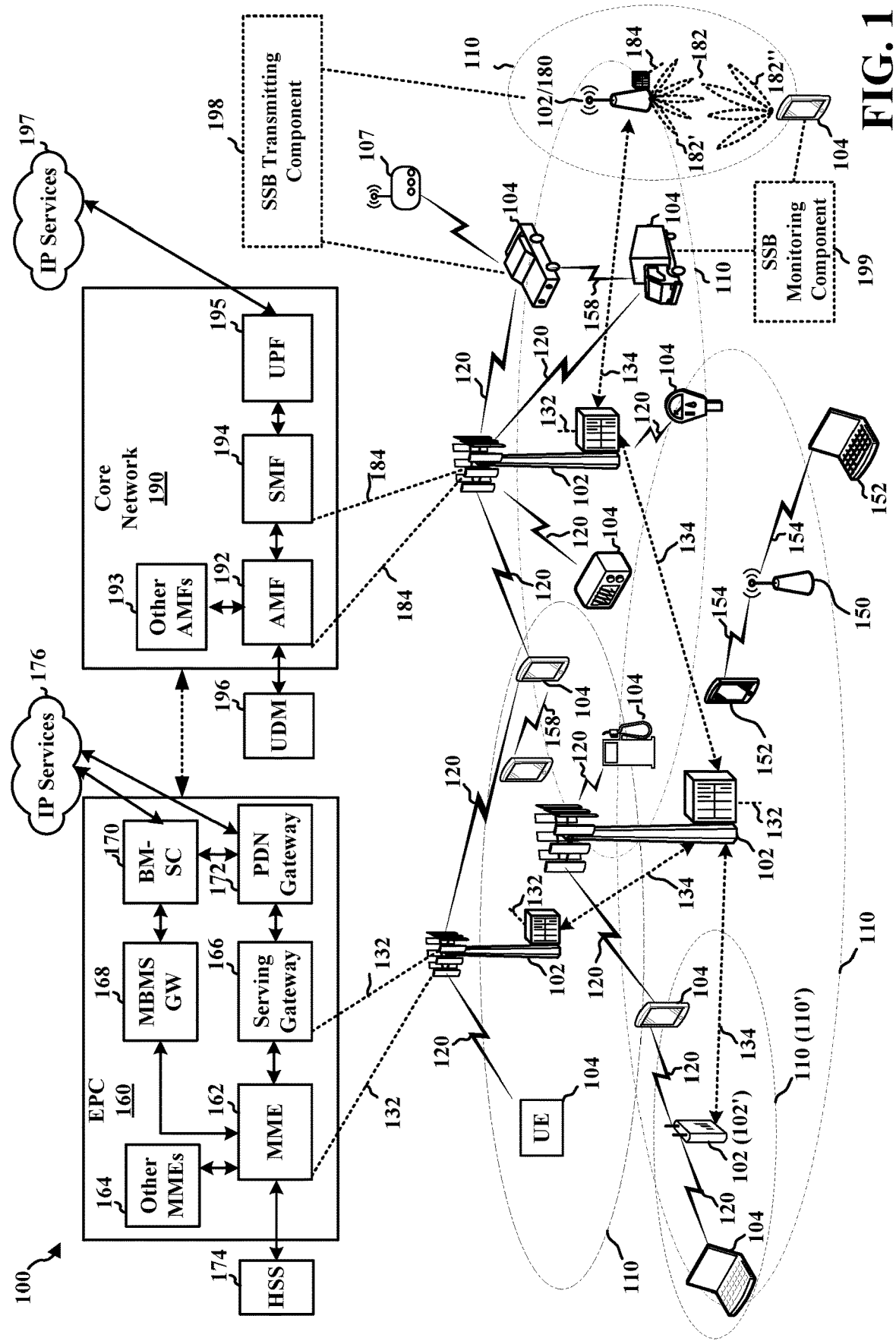
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term computer-readable medium is expressly defined to include any type of computer readable storage device and/or storage disk and to exclude propagating signals and to exclude transmission media. As used herein, "computer-readable medium," "machine-readable medium," "computer-readable memory," and "machine-readable memory" are used interchangeably.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2V/V2X/V2I or other D2D communication, such as Proximity Services (ProSe), etc. Communication based on V2V, V2X, V2I, and/or D2D may also be transmitted and received by other transmitting and receiving devices, such as Road Side Unit (RSU) 107, etc. Aspects of the communication may be based on PC5 or sidelink communication e.g., as described in connection with the example in FIG. 2E. Although the following description may provide examples for V2X/D2D communication in connection with 5G NR, the concepts described herein may be applicable to other similar areas, such as LTE, LTE-A, CDMA, GSM, and other wireless technologies.

Referring again to FIG. 1, in certain aspects, a first device, such as the UE 104 and/or the base station 102/180, may be configured to manage one or more aspects of wireless communication via beam-based sequence spaces for synchronization signals. As an example, in FIG. 1, the UE 104 and/or the base station 102/180 may include an SSB transmitting component 198 configured to select a subset of synchronization signal block (SSB) occasions including SSB occasions within an SSB period. In some examples, the subset of SSB occasions is associated with a pairing of a primary synchronization signal (PSS) and a secondary synchronization signal (SSS). The example SSB transmitting component 198 may also be configured to transmit an SSB using at least one SSB occasion from the subset of SSB occasions.

Still referring to FIG. 1, in certain aspects, a UE, such as the UE 104, may be configured to manage one or more aspects of wireless communication via beam-based sequence spaces for synchronization signals. As an example, in FIG. 1, the UE 104 may include an SSB monitoring component 199 configured to select a synchronization signal pairing. In some examples, the synchronization signal pairing may be associated with a pairing of a PSS and an SSS. In some examples, the synchronization signal pairing may map to a subset of SSB occasions including SSB occasions within an SSB period. It should be appreciated that in some examples, the mapping of the synchronization signal pairing may include mapping to the PSS (e.g., the mapping is independent of the SSS), mapping to the SSS (e.g., the mapping is independent of the PSS), or mapping to the (PSS, SSS) pairing. The example SSB monitoring component 199 may also be configured to monitor for an SSB at each SSB occasion from the subset of SSB occasions.

Although the following description may be focused on establishing a sidelink connection between two user equipment, the concepts described herein are similarly applicable to other similar areas, such as establishing an access link connection (e.g., between a UE and a base station). Furthermore, although the following description may be focused on 5G NR, the concepts described herein may be applicable to other similar areas, such as LTE, LTE-A, CDMA, GSM, and other wireless technologies in which a first device may establish a connection with a second device using the transmitting of SSBs.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

FIG. 2E illustrates example diagrams 201 and 202 illustrating examples slot structures that may be used for wireless communication between UE 104 and UE 104', e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include minislots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 201 illustrates a single slot transmission, e.g., which may correspond to a 0.5 ms transmission time interval (TTI). Diagram 202 illustrates an example two-slot aggregation, e.g., an aggregation of two 0.5 ms TTIs. Diagram 201 illustrates a single RB, whereas diagram 202 illustrates N RBs. In diagram 202, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2E, some of the REs may comprise control information, e.g., along with demodulation RS (DMRS). FIG. 2E also illustrates that symbol(s) may comprise CSI-RS. The symbols in FIG. 2E that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in busts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2E. Multiple slots may be aggregated together. FIG. 2E also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 3:
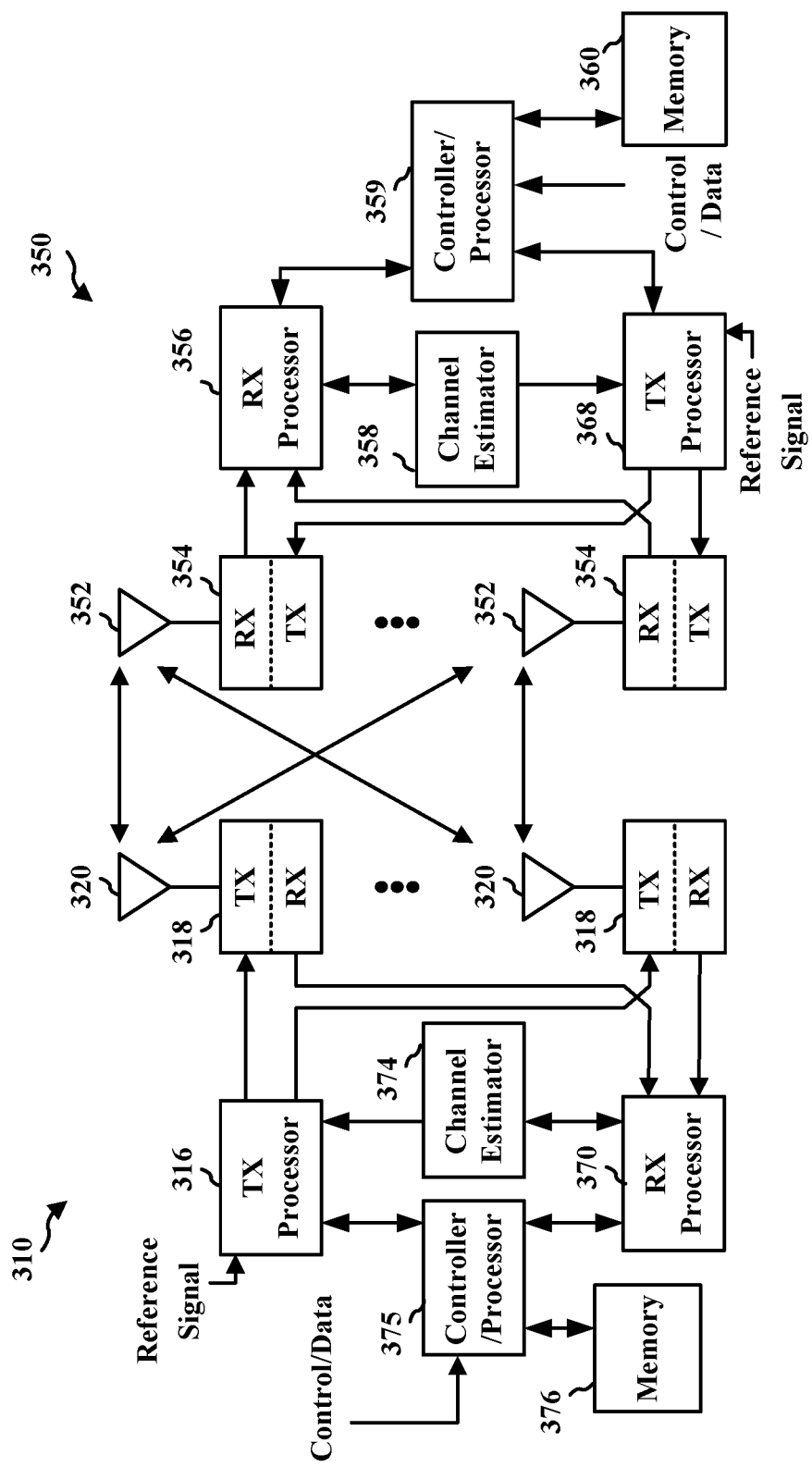
FIG. 3 is a diagram illustrating an example of two devices configured for wireless communication.

FIG. 3 is a block diagram of two devices configured for wireless communication. The devices may correspond to a base station 310 in communication with a UE 350 in an access network. In other examples, both devices may correspond to UEs that communicate directly with each other. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the SSB monitoring component 199 of FIG. 1.

At least one of the TX processor 316, the RX processor 370, and the controller/processor 375 may be configured to perform aspects in connection with the SSB transmitting component 198 of FIG. 1.

A UE trying to access a communication network may follow a cell search procedure that may include a series of synchronization stages. In some examples, the synchronization stages may enable the UE to determine time and/or frequency parameters that may be useful for demodulating downlink signals, transmitting with the correct timing, and/or acquiring system parameters. Synchronization signal blocks (SSBs) may include a primary synchronization signal (PSS), a secondary synchronization signal (SSS), and a physical broadcast channel (PBCH). The PSS may be used by the UE to determine symbol timing and a physical layer identity. The SSS may be used by the UE to determine a physical layer cell identity group number (e.g., a "cell identifier") and radio frame timing. The PBCH may carry a master information block (MIB), which may provide a number of resource blocks in the system bandwidth and a system frame number.

The SSBs may be transmitted (e.g., by a base station) at predetermined locations (e.g., time locations) within an SSB period, and the maximum number of SSBs may depend on the frequency band. In some examples, the SSB periodicity may be 10 ms or 20 ms. In certain such examples, the first 5 ms of each period may carry (e.g., in those slots) some predetermined OFDM symbols corresponding to the number N of SSBs transmitted. In some examples, each SSB may be transmitted on a different beam, and the UE may search for all of the SSBs until the UE identifies a suitable SSB (e.g., an SSB associated with a satisfactory measurement). In certain such examples, once the UE identifies a suitable SSB, the UE may read the PBCH and then acquire the SIB (e.g., SIB1), which may indicate how many SSBs are transmitted. For example, as mentioned above, the SSB may include a PSS, an SSS, and PBCH. The UE may obtain symbol timing from the PSS. The UE may then obtain the cell identifier from the SSS. The UE may then read the MIB that is encoded in the PBCH, which may include information used to read SIBs. The UE may then acquire the SIB 1. After the UE is operating in a connected mode, the base station may indicate which SSBs are transmitted via a separate dedicated RRC configuration, which may be more detailed than (and may, thus, override) the indication in SIB 1.

Example techniques disclosed herein facilitate a UE determining how many SSBs are transmitted via an earlier indicator. Furthermore, example techniques disclosed herein facilitate providing beam-related information via the earlier indicator. In some examples, the disclosed techniques may be utilized for establishing an access link connection (e.g., between a base station and a UE). In some examples, the disclosed techniques may be utilized for establishing a sidelink connection (e.g., between a UE and another UE).

For example, disclosed techniques may associate a search space with subsets of SSB occasions. In certain such examples, each subset may be associated with a predetermined subset of possible locations of transmitted SSBs (e.g., SSB occasions). By associating the different subsets with respective SSB occasions, the UE may limit the search space to those respective SSB occasions associated with the corresponding subset. Furthermore, in some examples, by limiting the SSB occasions to a subset of the maximum SSB occasions (or full set of SSB occasions), later indications of which SSBs are actually transmitted (e.g., as indicated in an SIB and/or RRC message) may be further compressed into fewer bits as the later indications may index (or map) to those SSB occasions associated with the corresponding subset. For example, if the maximum number of SSBs is 64 SSBs per SSB period, but an SSB subset includes four SSB occasions, then the later indication of which SSBs are actually transmitted may be compressed into a four-bit space rather than a 64-bit space.

Figure 4:
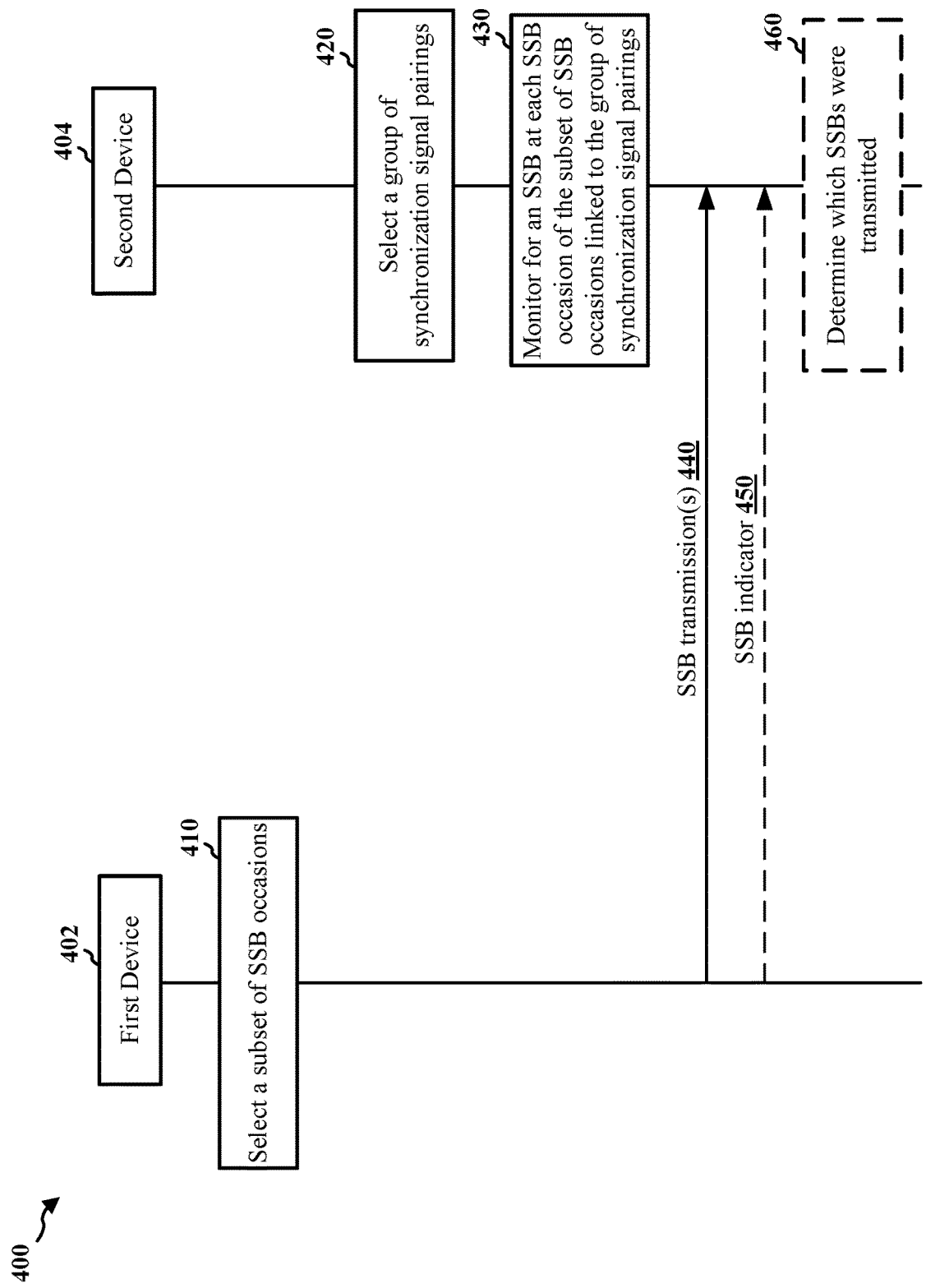
FIG. 4 illustrates an example communication flow between a first device and a second device, in accordance with the teachings disclosed herein.

FIG. 4 illustrates an example wireless communication 400 between a first device 402 and a second device 404, as presented herein. In the illustrated wireless communication 400, the first device 402 and the second device 404 may be establishing a sidelink connection between two UEs. For example, aspects of the first device 402 and the second device 404 may be implemented by the UE 104 of FIG. 1 and/or the UE 350 of FIG. 3. However, it should be appreciated that in some examples, the first device 402 may be implemented by the base station 102/180 of FIG. 1 and/or the base station 310 of FIG. 3.

It should be appreciated that while the wireless communication 400 may include the first device 402 and the second device 404 establishing a sidelink connection, in additional or alternative examples, the first device 402 and/or the second device 404 may be in communication with any suitable quantity of UEs and/or base stations. For example, the first device 402 may be operating in a connected mode with a base station (e.g., after establishing an access link with the base station) and the first device 402 may also be establishing a sidelink connection with the second device 404.

It should be appreciated that while the transmissions included in the wireless communication 400 may appear to be transmissions from the first device 402 to the second device 404, in additional or alternative examples, the transmissions transmitted by the first device 402 may be broadcast transmissions that are received by the second device 404.

At 410, the first device 402 may select a subset of SSB occasions to transmit. In some examples, the quantity of SSB occasions included in the subset of SSB occasions may be less than the maximum number of SSB occasions associated with the frequency range. For example, the maximum number of SSB occasions for mmW frequencies may be 64 SSBs per SSB period, but the quantity of SSB occasions included in the selected subset of SSB occasions (e.g., Subset 1) may be four SSB occasions. In some examples, the selected subset of SSB occasions may include SSB occasions within an SSB period.

In some examples, the subset of SSB occasions may be selected from a set of SSB occasions. For example, a first subset of SSB occasions may include a full set of SSB occasions (e.g., the maximum number of SSB occasions), a second subset of SSB occasions may include alternating SSB occasions (e.g., an even subset of SSB occasions, and a third subset of SSB occasions may also include alternating SSB occasions (e.g., an odd subset of SSB occasions).

In some examples, the subset of SSB occasions may be associated with a group of synchronization signal pairings. For example, a group of synchronization signal pairings may include one or more PSS and SSS pairings, and the PSS and SSS pairings of the group may map to the same subset of SSB occasions. Thus, it should be appreciated that in some examples, there may be one or more groups of synchronization signal pairings and different groups of synchronization signal pairings may map to different subsets of SSB occasions, but within a group of synchronization signal pairings, the one or more PSS and SSS pairings may map to the same respective subset of SSB occasions. For example, a first group of synchronization signal pairings (e.g., group 1) may include a (PSS-1, SSS-1) pairing, a second group of synchronization signal pairings (e.g., group 2) may include a (PSS-2, SSS-2) pairing, and a third group of synchronization signal pairings (e.g., group 3) may include a (PSS-3, SSS-3) pairing and a (PSS-4, SSS-4) pairing. In some examples, each of the synchronization signal pairings of group 1 (e.g., the (PSS-1, SSS-1) pairing) may map to a first subset of SSB occasions, each of the synchronization signal pairings of group 2 (e.g., the (PSS-2, SSS-2) pairing) may map to a second subset of SSB occasions, and each of the synchronization signal pairings of group 3 (e.g., the (PSS-3, SSS-3) pairing and the (PSS-4, SSS-4) pairing) may map to a third subset of SSB occasions.

It should be appreciated that while the above example illustrates partitioning the search space into groups based on synchronization signal pairings, in other examples, the groups may be partitioned into groups based on raster points. In still other examples, the search space may be partitioned into groups based on a combination of synchronization signal pairings and raster points.

In some examples, a linking (or mapping) between the subset(s) of SSB occasions and the group(s) of synchronization signal pairings may be predetermined. For example, the one or more subsets of SSB occasions and the one or more synchronization signal pairings of the respective groups may be accessible via a table (e.g., stored locally at the first device 402 and/or accessed remotely via the network). In some examples, the linking between the subset(s) of SSB occasions and the group(s) of synchronization signal pairings may be provided to the device (e.g., via a rule). For example, the first device 402 may be a non-standalone/dual-connectivity device that has an LTE connection as an anchor (or "master cell group") and may be trying to add a NR connection as a secondary cell group. In certain such examples, the linking may be provided to the first device 402 via the master cell group. In some examples, the linking may be indicated via the network. For example, the first device 402 may be a UE that receives the linking from a base station that is serving the UE or the last base station that was serving the UE.

At 420, the second device 404 may select a group of synchronization signal pairings.

In some examples, the second device 404 may select a synchronization signal pairing (e.g., a (PSS, SSS) pairing) and associate the randomly selected pairing with a group. In some examples, the second device 404 may randomly select the synchronization signal pairing. In some examples, the second device 404 may utilize predetermined techniques for selecting the synchronization signal pairing (e.g., by implementing a rule, etc.).

At 430, the second device 404 may monitor for an SSB at each SSB occasion from a subset of SSB occasions that maps to the group of synchronization signal pairings. For example, the second device 404 may map the group of synchronization signal pairings to the subset of SSB occasions based on a linking provided via a table, via a master cell group, and/or via an indication provided by a (last) serving base station. It should be appreciated that in some examples, the subset of SSB occasions may be a function of (e.g., based on) the synchronization signal pairing. For example, based on the selected pairing, the second device 404 may determine the subset of SSB occasions.

The first device 402 may transmit one or more SSBs 440 at the SSB occasions of the selected subset of SSB occasions. The first device 402 may also transmit an SSB indicator 450 indicating which of the SSB occasions of the selected subset of SSB occasions that the first device 402 actually transmits an SSB. In some examples, the first device 402 may transmit the SSB indicator 450 after the one or more SSBs 440 are acquired by the second device 404.

At 460, the second device 404 may determine which SSBs are transmitted. For example, the second device 404 may utilize the SSB indicator 450 to determine which SSB occasions within an SSB period are actually used to transmit.

As explained above, in some examples, the subset of SSB occasions may be mapped to (or linked with) pairings of PSS and SSS. In some examples, the subset of SSB occasions may be mapped to (or linked with) raster points. For example, raster points may include a set of possible SSB locations in frequency. In some examples, the subset of SSB occasions may be mapped to (or linked with) the respective groups based on a combination of pairings of PSS and SSS and via raster points.

In some examples, the selecting of the subset of SSB occasions, at 410, may be determined by the first device 402 (e.g., when a table providing the linking is available to the first device 402). In some examples, the selecting of the subset of SSB occasions, at 410, may be determined by the first device 402 based on possible guidance received from a base station or the network. For example, a base station with a currently established access link (or the last established access link) with the first device 402 may provide the first device 402 one or more rules for selecting the subset of SSB occasions.

In some examples, the SSB occasions included in the respective subsets of SSB occasions may be based on one or more beam characteristics associated with the transmitting of the SSB. In some examples, the beam characteristics may include a beam shape, beam width and/or a beam direction. In some examples, the SSB occasions in the subset of SSB occasions may be determined based on a beam-width threshold. For example, SSB occasions associated with relatively broad beams (e.g., that have a beam-shape that is greater than (or equal to) the beam-width threshold) may be included in a first subset of SSB occasions, while SSB occasions with relatively narrow beams (e.g., that have a beam-shape that is less than (or equal to) the beam-width threshold) may be included in a second subset of SSB occasions.

Figure 5:
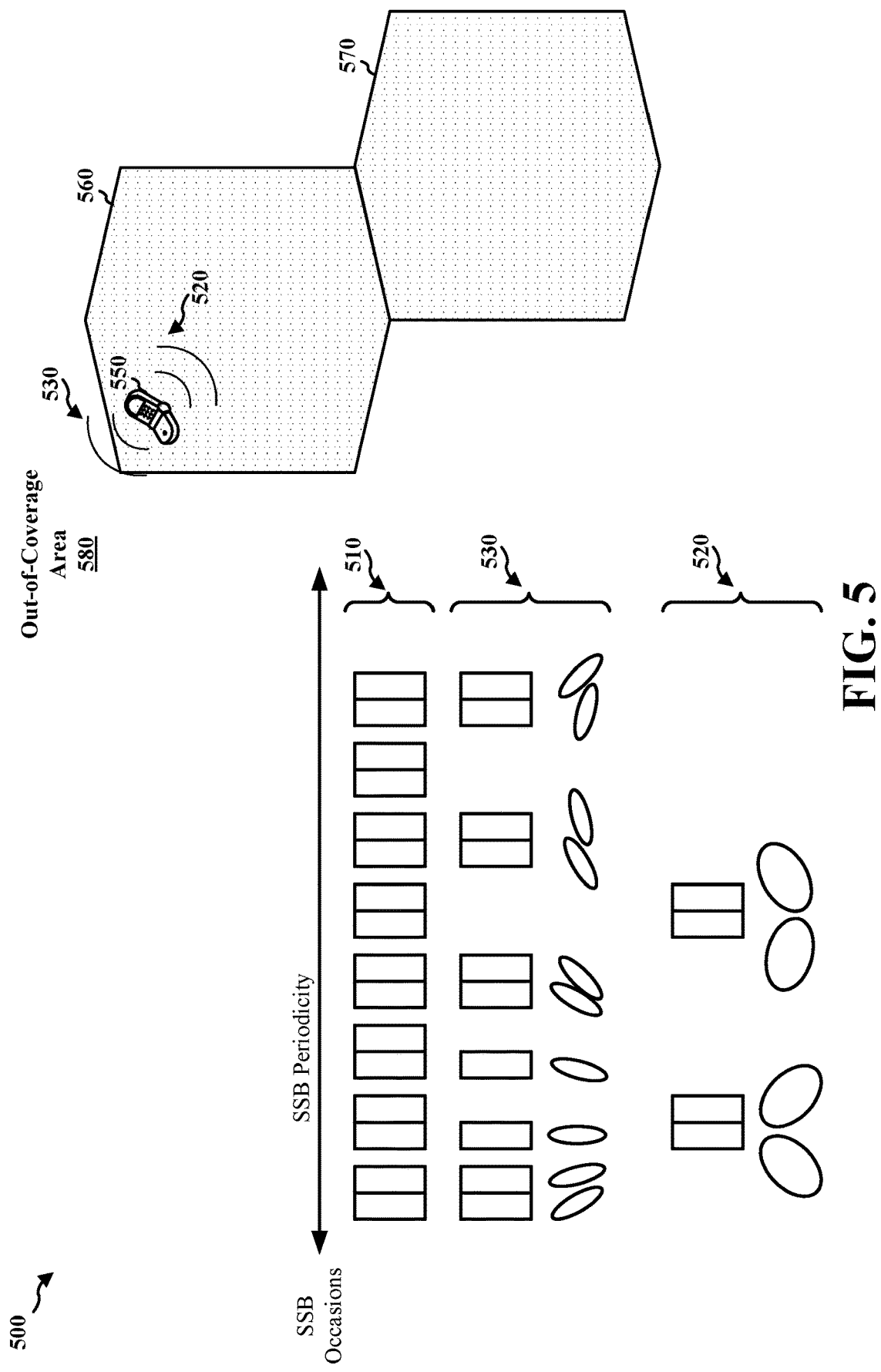
FIG. 5 depicts an example illustration of a set of SSB occasions including a first subset of SSB occasions and a second subset of SSB occasions, in accordance with the teachings disclosed herein.

FIG. 5 depicts an example illustration 500 of a set of SSB occasions 510, a first subset of SSB occasions 520 and a second subset of SSB occasions 530, as presented herein. In the illustrated example of FIG. 5, the set of SSB occasions 510 includes sixteen SSB occasions. The SSB occasions included in the first subset of SSB occasions 520 are associated with a relatively broad beam-shape. The SSB occasions included in the second subset of SSB occasions 530 are associated with a relatively narrow beam-shape. The first subset of SSB occasions 520 includes four SSB occasions. The second subset of SSB occasions 530 include ten SSB occasions.

In some examples, the selecting of the subset of SSB occasions, at 410, may be based on the beam characteristics and/or the location of the device with respect to one or more cells. For example, a device transmitting between cells may transmit using relatively broader beams so that the signals do not interfere, while a device located at the edge of a cell and transmitting into an out-of-coverage area may transmit using relatively narrow beams so that the signals penetrate further into the out-of-coverage area.

For example, as shown in FIG. 5, a device 550 (e.g., a UE) located at the edge of a first cell 560 may select to use the relatively broader beams of the first subset of SSB occasions 520 when transmitting signals in the direction of a second cell 570. The device 550 may select to use the relatively narrower beams of the second subset of SSB occasions 530 when transmitting signals into an out-of-coverage area 580.

In some examples, the subset of the SSB occasions may be based on a number of SSBs. For example, a relatively large number of SSBs may correspond to relatively narrow beams, while a relatively small number of SSBs may correspond to relatively broader beams. In certain such examples, the number of SSB occasions included in the first subset of SSB occasions 520 associated with the relatively broader beams may be less than the number of SSB occasions included in the second subset of SSB occasions 530 associated with the relatively narrower beams.

In some examples, the selecting of the subset of SSB occasions, at 410, may be based on a pointing direction of the device. For example, if the first device 402 is able to determine its pointing direction (e.g., using orientation sensors, such as a gyroscope, an accelerometer, a magnetometer, etc.), the first device 402 may use the pointing direction to select the subset of SSB occasions. For example, assuming the first device 402 has line-of-sight with the second device 404, the first device 402 may select the first subset of SSB occasions 520 associated with the relatively broader beams when the pointing direction is in the direction of the second cell 570. Similarly, when the pointing direction is in the direction of the out-of-coverage area 580, the first device 402 may select the second subset of SSB occasions 530 associated with the relatively narrower beams.

In some examples, the selecting of the subset of SSB occasions, at 410, may be based on beam-widths. For example, the first device 402 may detect two multi-paths. In certain such examples, using relatively narrower beams may facilitate separating out the beams, while using relatively broader beams may result in comparable energies associated with the beams and, thus, make it difficult to differentiate the beams.

In some examples, the SSB indicator 450 of the actual SSBs that are transmitted may be included in a SIB (e.g., SIB1 for access link communications between a UE and a base station, another SIB such as SIB12 for sidelink communications between UEs) and/or via RRC signaling. In some examples, the SSB indicator 450 may include a reference to the selected subset of SSB occasions. In some examples, the SSB indicator 450 may be independent of the selected subset of SSB occasions.

In some examples, the SSB indicator 450 may be compressed compared to when the SSB occasions are not restricted to subsets. For example, referring to the example subsets of SSB occasions 520, 530 of FIG. 5, the first subset 520 includes four SSB occasions. Thus, when the first subset 520 is selected (e.g., at 410), the SSB indicator 450 may be limited to four bits where each bit may be associated with one of the four SSB occasions of the first subset of SSB occasions 520 (e.g., indicating whether an SSB was transmitted at each of the four SSB occasions). Similarly, the second subset 530 includes ten SSB occasions. Thus, when the second subset 530 is selected (e.g., at 410), the SSB indicator 450 may be limited to ten bits. In either case, the size of the SSB indicator 450 may be compressed (e.g., four bits or ten bits in the illustrated example) when compared to the sixteen bits that may be used to indicate the possible sixteen SSB occasions. In some examples, further compression of the SSB indicator 450 may be achieved by partitioning the SSB occasions within the subset into SSB occasion groups and indicating presence or absence of transmission of the SSB occasion groups rather than of the individual SSBs at each occasion. In certain such examples, one or more bits may be used to indicate the structure of the SSB occasion groups.

It should be appreciated that in some examples, the selected subset of SSB occasions may be useful for reducing the search space when monitoring for SSBs (e.g., at 430). For example, based on the selected group of synchronization signal pairings (at 420), the second device 404 may map the respective pairings of the group to those SSB occasions included in the corresponding subset of SSB occasions (e.g., as indicated by the linking).

However, it should be appreciated that the first device 402 is not limited to transmitting using just those SSB occasions of the selected subset of SSB occasions. For example, the first device 402 may also transmit SSBs using SSB occasions outside of the SSB occasions corresponding to the selected subset. In certain such examples, by utilizing subsets of SSB occasions, disclosed techniques facilitate limiting the search space of the second device 404 for initial synchronization, but then the full set of SSBs may be indicated to the second device 404 after the devices 402, 404 are connected (e.g., via the SSB indicator 450).

It should be appreciated that the example of FIG. 5 may be directed to establishing a sidelink connection or to establishing an access link connection. For example, the beam characteristics may be useful for SSB searching and/or beam refinement during access link. For example, in some examples, a base station included in the access link connection may have a relatively fixed position and/or orientation. In certain such examples, variability in position and/or orientation when facilitating the access link connection may be reduced to one device (e.g., the UE), while the variability in position and/or orientation when facilitating the sidelink connection may be the two devices.

Figure 6:
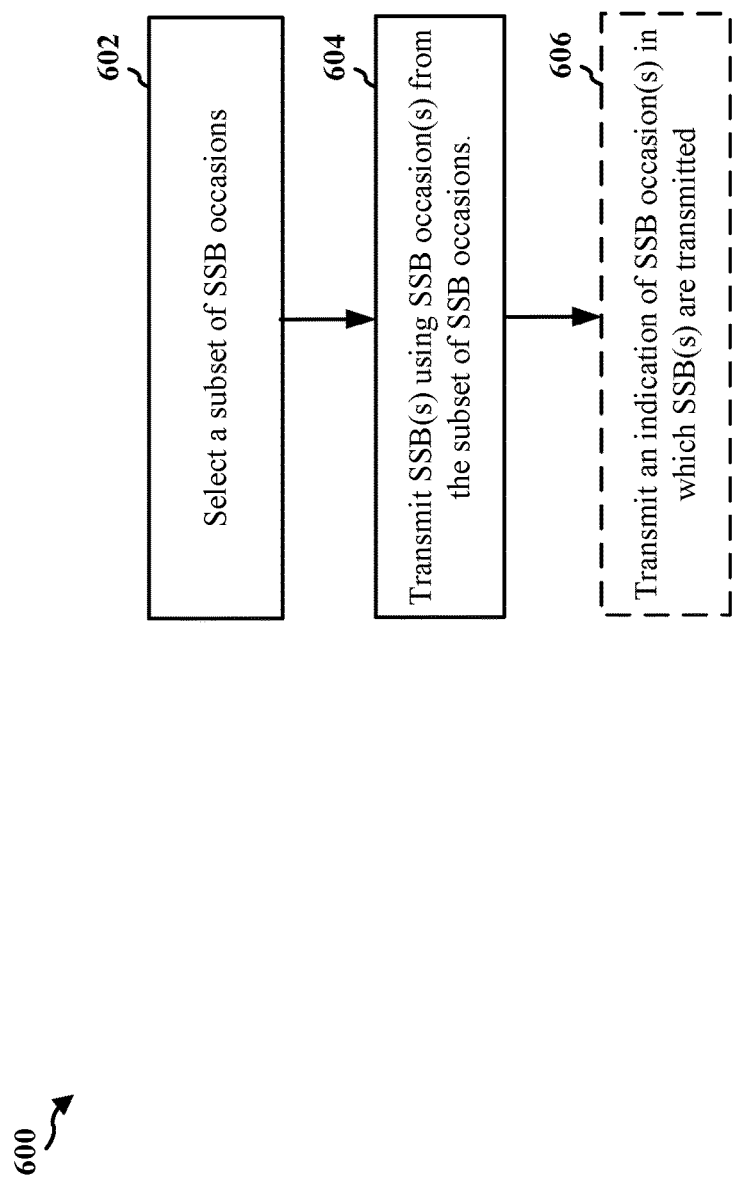
FIG. 6 is a flowchart of a method of wireless communication.

FIG. 6 is a flowchart 600 of a method of wireless communication. The method may be performed by a first device (e.g., the first device 402, which may include a UE or a base station). For example, the method may be performed by a UE or a component of a UE for communication based on sidelink (e.g., the UE 104, 350, 550; the apparatus 702/702'; the processing system 814, which may include the memory 360 and which may be the entire UE or a component of the UE, such as the TX processor 368, the RX processor 356, and/or the controller/processor 359). In another example, the method may be performed by a base station or a component of a base station for communication based on an access link (e.g., the base station 102, 180, 310; the apparatus 702/702'; the processing system 814, which may include the memory 376 and which may be the entire base station or a component of the base station, such as the TX processor 316, the RX processor 370, and/or the controller/processor 375). Optional aspects are illustrated with a dashed line.

At 602, a subset of SSB occasions is selected. The subset of SSB occasions includes SSB occasions within an SSB period, and the subset of SSB occasions is associated with a pairing of a PSS and an SSS. The subset of SSB occasions may be selected, e.g., by SSB subset component 708 of apparatus 702. For example, the joint space for PSS, SSS sequences in an SSB period for SSB occasions may be partitioned into groups. In another example, each SSB of the set of SSBs is associated with a PSS, SSS pairing and a raster point. Thus, subset of SSB occasions may also be based on synch raster partitioning. Each subset may be associated with a restricted set of possible locations of transmitted SSBs, thereby limiting a search space for a UE that is monitoring for SSB(s). Thus, the quantity of SSB occasions included in the subset of SSB occasions may be less than a maximum number of SSB occasions for a frequency band. The subset of SSB occasions may be selected by the base station or the UE transmitting the SSB(s). In another example, the subset of SSB occasions may be selected based on a rule received from a base station.

Each SSB occasion of the subset of SSB occasions may be associated with a beam characteristic. The beam characteristic may comprise a beam shape or a beam-width. The SSB occasions included in the subset of SSB occasions may be based on a beam-width threshold. The linking between the beam widths and the subset of SSB occasions may be implicit. For example, a larger number of SSB occasions may indicate a narrower beam-width associated with the SSB occasions, whereas a smaller number of SSB occasions may indicate a wider beam-width associated with the SSB occasions. The beam characteristic may comprise a beam direction. The association of a beam-width and/or a beam direction with the subset of SSB occasions may assist in the search and/or received beam refinement process.

As well, beam-width may be used to manage interference. For example, a UE at a cell edge may use broad beams to transmit SSBs to minimize interference to neighboring cells. In contrast, UEs that are outside of coverage of a cell may prioritize PSS, SSS pairings mapped to narrower beams for SSB(s). Thus, the subset of SSB occasions may be selected, at 602, by first determining a location of the first device with respect to a cell and selecting the subset of SSB occasions based on the location. When the location corresponds to an edge of the cell, the first device may select the subset of SSB occasions associated with a beam-width greater than (or equal to) a beam threshold. When the location corresponds to an edge of the cell, the first device may select the subset of SSB occasions associated with a beam direction or a beam-width for serving out-of-coverage user equipment.

At 604, SSB(s) are transmitted using at least one SSB occasion from the subset of SSB occasions. The SSB(s) correspond to the SSB occasion(s) comprised in the subset of SSB occasion(s) indicated at 602. For example, SSB component 712 and/or transmission component 706 of apparatus 702 may transmit the SSB(s).

As illustrated at 606, an indication of the at least one SSB occasion from the subset of SSB occasions may also be transmitted. The indication of the SSB occasion(s) may be transmitted by SSB occasion indication component 714 and/or transmission component 706 of apparatus 702. The indication, at 606, indicates the SSB occasion(s) that are used by the base station or UE to transmit SSB(s). The indication may be comprised in a SIB or RRC message. The indication may be indicated with reference to the subset of SSB occasions. For example, this more detailed indication may provide an index with reference to the restricted set, e.g., the subset of SSB occasions. This may enable the indication to be sent with reduced bits. The number of bits may be a function of the PSS, SSS sequence. In another example, the indication may be independent of the subset of SSB occasions. Thus, the identifier of the subset of SSB occasions may only apply to an initial search by a UE.

Figure 7:
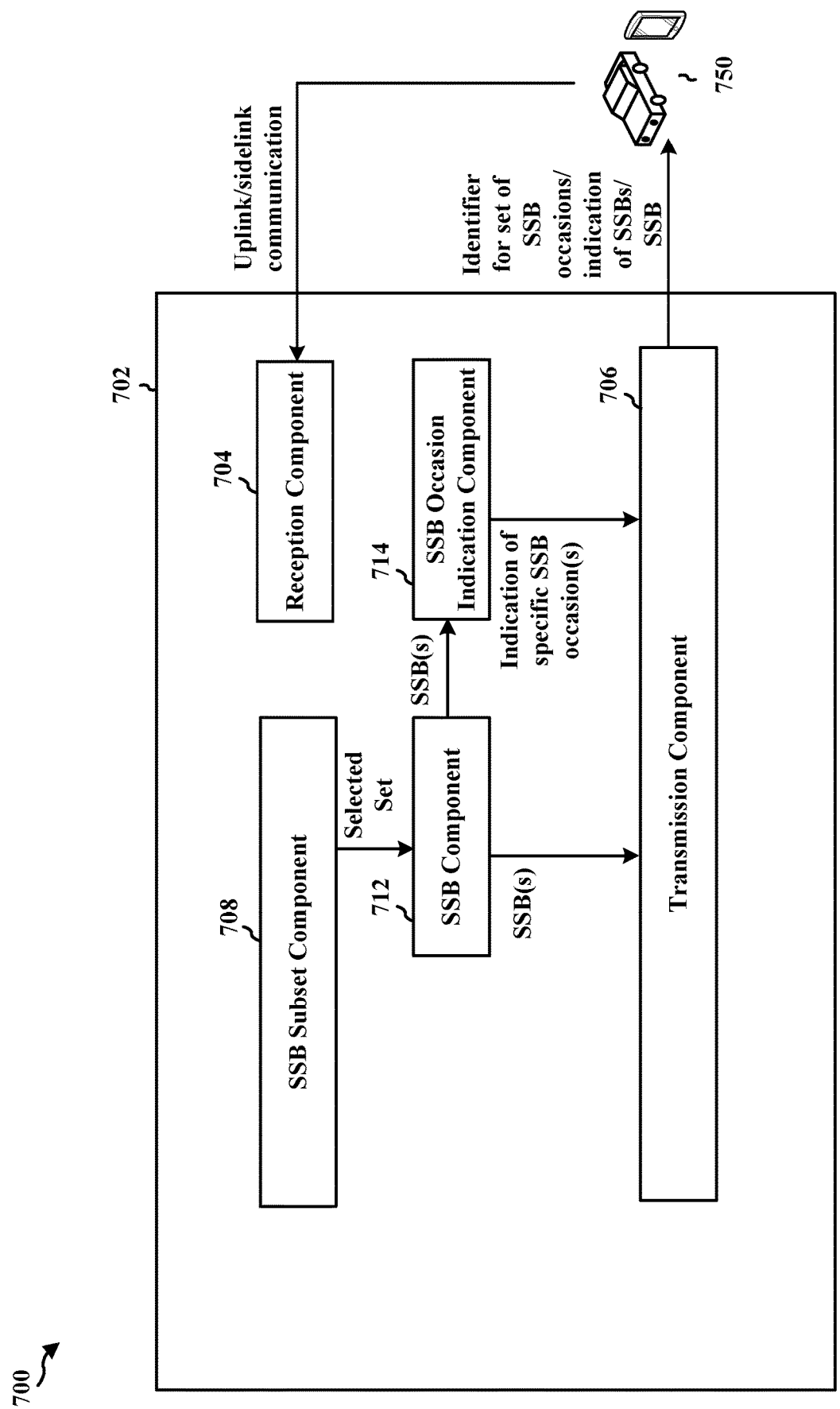
FIG. 7 is a conceptual data flow diagram illustrating the data flow between different means/components in an example apparatus.

FIG. 7 is a conceptual data flow diagram 700 illustrating the data flow between different means/components in an example apparatus 702. The apparatus may be a base station or a component of a base station, e.g., for communication based on an access link. In another example, for communication based on sidelink, the apparatus may comprise a UE or a component of a UE. The apparatus includes a reception component 704 that receives communication from a UE 750, e.g., over an access link or over sidelink. The apparatus includes a transmission component 706 configured to transmit communication to UE(s) 750, e.g., over an access link or sidelink. The apparatus includes an SSB subset component 708 configured to select a subset of SSB occasions, the subset of SSB occasions including SSB occasions within an SSB period, and the subset of SSB occasions being associated with a pairing of a PSS and an SSS and/or a raster point, e.g., as described in connection with 602 of FIG. 6. The apparatus includes an SSB component 712 configured to transmit SSB(s) using at least one SSB occasion from the set of SSB occasions, e.g., as described in connection with 604 in FIG. 6. The apparatus includes an SSB occasion indication component 714 configured to transmit an indication of the at least one SSB occasion from the subset of SSB occasions, e.g., as described in connection with 606 in FIG. 6.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
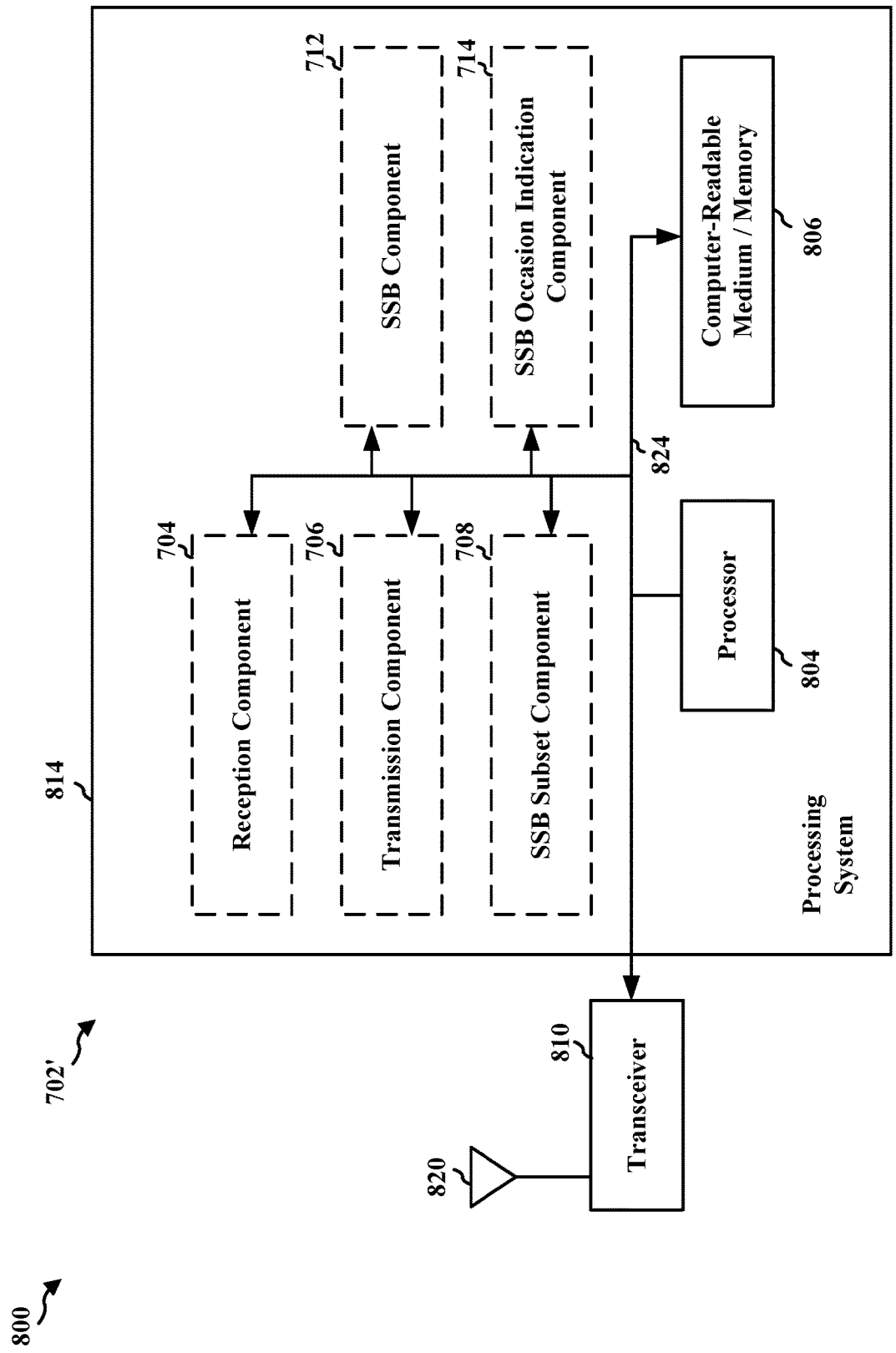
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 712, 714, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 712, 714. The components may be software components running in the processor 804, resident/stored in the computer readable medium/memory 806, one or more hardware components coupled to the processor 804, or some combination thereof. In an example, e.g., for communication over an access link, the processing system 814 may be a component of the base station 310 and may include the memory 376 and/or at least one of the TX processor 316, the RX processor 370, and the controller/processor 375. Alternatively, the processing system 814 may be the entire base station (e.g., see the base station 310 of FIG. 3). In another example, e.g., for sidelink communication, the processing system 814 may be a component of the UE 350 and may include the memory 360 and/or at least one of the TX processor 368, the RX processor 356, and the controller/processor 359.

Alternatively, the processing system 814 may be the entire UE (e.g., see the UE 350 of FIG. 3).

In one configuration, the apparatus 702/702' for wireless communication includes means for selecting a subset of synchronization signal block (SSB) occasions including SSB occasions within an SSB period, and wherein the subset of SSB occasions is associated with a pairing of a PSS and an SSS. The apparatus may include means for transmitting an SSB using at least one SSB occasion from the subset of SSB occasions. The apparatus may include means for transmitting an indication of the at least one SSB occasion from the subset of SSB occasions, wherein the indication is comprised in a SIB or RRC message. The apparatus may comprise means for determining a location of the first device with respect to a cell. The apparatus may comprise means for selecting the subset of SSBs based on the location. The aforementioned means may be one or more of the aforementioned components of the apparatus 702 and/or the processing system 814 of the apparatus 702' configured to perform the functions recited by the aforementioned means. As described supra, for communication over an access link, the processing system 814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means. As described supra, for sidelink communication, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
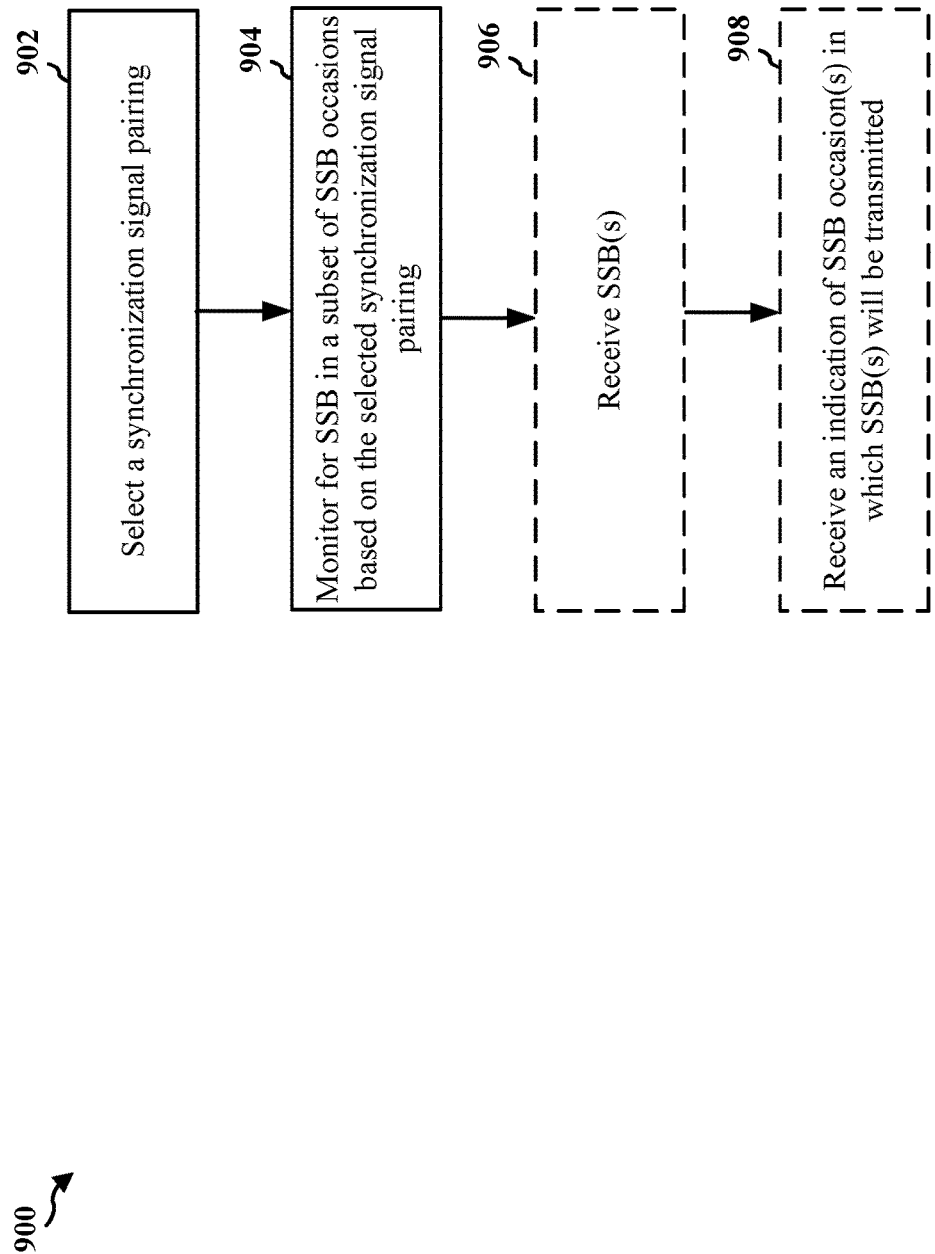
FIG. 9 is a flowchart of a method of wireless communication.

FIG. 9 is a flowchart 900 of a method of wireless communication. The method may be performed by a second device (e.g., the second device 404, which may include a UE). For example, the method may be performed by a UE or a component of a UE (e.g., the UE 104, 350; the apparatus 1002/1002'; the processing system 1114, which may include the memory 360 and which may be the entire UE or a component of the UE, such as the TX processor 368, the RX processor 356, and/or the controller/processor 359). Optional aspects are illustrated with a dashed line. The method may improve an initial search for SSBs, e.g., and may enable the UE to search for SSBs more efficiently using an initial indication of a set of SSB occasions.

At 902, the UE selects a synchronization signal pairing. In some examples, the UE may randomly select the synchronization signal pairing. In some examples, the UE may utilize predetermined techniques for selecting the synchronization signal pairing. The synchronization signal pairing may be associated with a pairing of a PSS and an SSS. The synchronization signal pairing may map to a subset of synchronization signal block (SSB) occasions including SSB occasions within an SSB period. The synchronization signal pairing may be selected by a synchronization signal pairing component 1008 of apparatus 1002. For example, the joint space for PSS, SSS sequences in an SSB period for SSB occasions may be partitioned into groups of synchronization signal pairings. In another example, each SSB occasion of the subset of SSB occasions may be associated with a PSS, SSS pairing and a raster point. Thus, the subsets of SSB occasions may also be based on synch raster partitioning. Each subset may be associated with a restricted set of possible locations of transmitted SSBs, thereby limiting a search space for the UE when monitoring for SSB(s). Thus, the quantity of SSB occasions included in the subset of SSB occasions may be less than a maximum number of SSB occasions for a frequency band.

Each SSB occasion of the subset of SSB occasions may be associated with a beam characteristic. The beam characteristic may comprise a beam shape or beam-width. The SSB occasions included in the subset of SSB occasions may be based on a beam-width threshold. The linking between the beam-widths and the subset of SSB occasions may be implicit. For example, a larger number of SSB occasions may indicate a narrower beam width associated with the SSB occasions, whereas a smaller number of SSB occasions may indicate a wider beam width associated with the SSB occasions. The beam characteristic may comprise a beam direction. The association of a beam-width and/or a beam direction with the subset of SSB occasions may assist in the search and/or received beam refinement process.

At 904, the UE monitors for an SSB at each SSB occasion from the subset of SSB occasions mapped to the selected synchronization signal pairing. A base station or UE may transmit SSB(s) using the subset of SSB occasions. However, by mapping particular SSB occasions to the synchronization signal pairing and limiting SSB locations to within the subset of SSB occasions, the search space monitored by the UE may be reduced. For example, the monitoring may be performed by monitor component 1010 of apparatus 1002.

As illustrated at 906, the UE may receive SSB(s) in at least one SSB occasion from the subset of SSB occasions. For example, the UE may receive an SSB from a base station for an access link or may receive an SSB from another UE for sidelink communication. The reception may be performed by reception component 1004 and/or SSB component 1012 of apparatus 1002.

As illustrated at 908, the UE may receive an indication of the at least one SSB occasion from the subset of SSB occasions after the UE acquires an SSB. The indication of the SSB occasion(s) may be received by SSB occasion indication component 1014 and/or reception component 1004 of apparatus 1002. The indication, at 908, indicates the SSB occasion(s) that are used by the base station or UE to transmit SSB(s). The indication may be comprised in a SIB or RRC message. The indication may be received with reference to the subset of SSB occasions. For example, this more detailed indication may provide an index with reference to the subset of SSB occasions. This may enable the indication to be received with reduced bits. The number of bits may be a function of the PSS, SSS sequence. In another example, the indication may be independent of the subset of SSB occasions.

Figure 10:
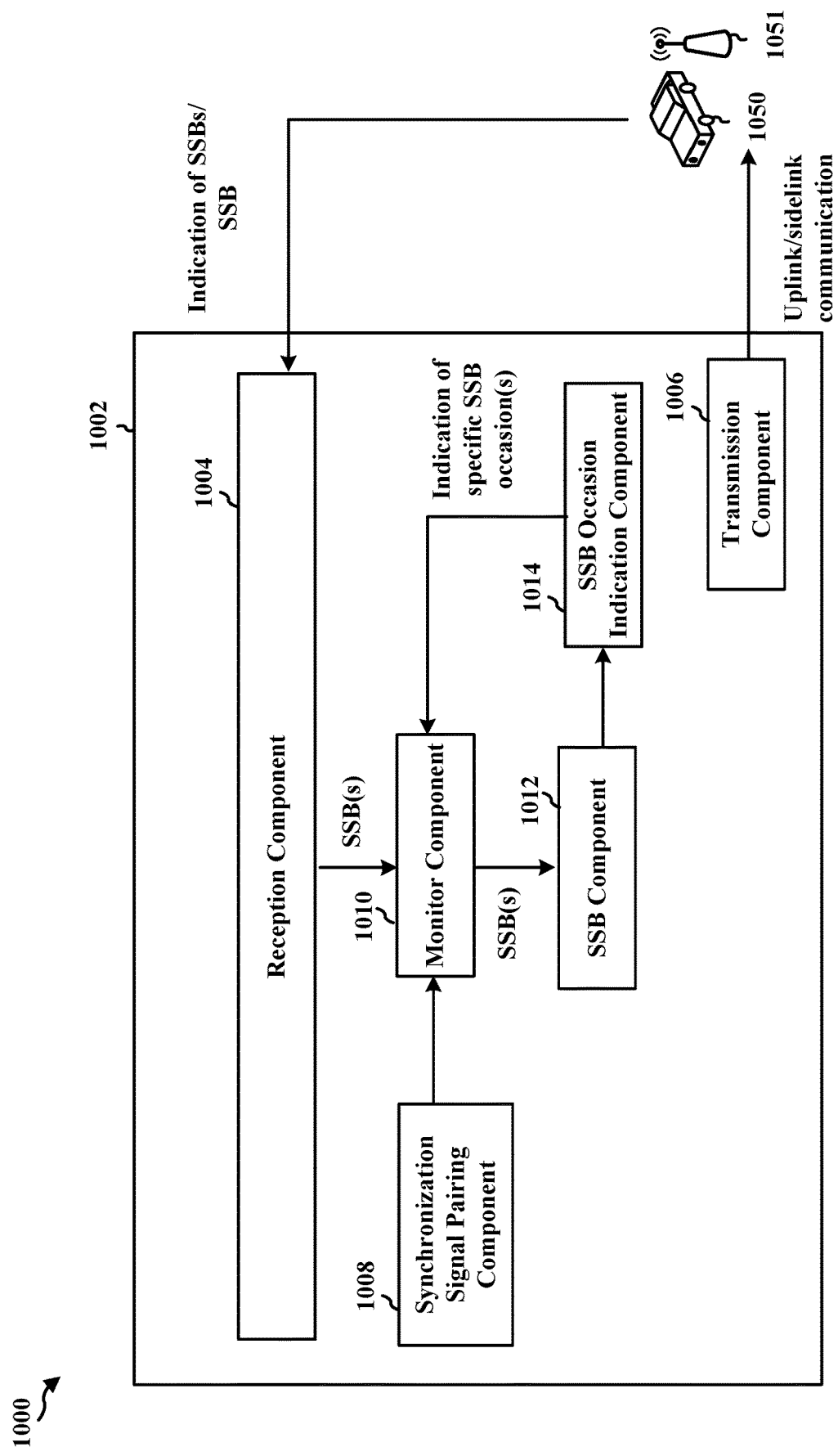
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a UE or a component of a UE. The apparatus includes a reception component 1004 that receives downlink communication from base station 1051 and/or that receives sidelink communication from UE 1050. The apparatus includes transmission component 1006 configured to transmit uplink communication to base station 1051 and/or sidelink communication to UE 1050. The apparatus includes a synchronization signal pairing component 1008 configured to select a synchronization signal pairing that maps to a subset of SSB occasions, e.g., as described in connection with 902 in FIG. 9. The apparatus includes a monitor component 1010 configured to monitor for an SSB at each SSB occasion from the subset of SSB occasions, e.g., as described in connection with 904 in FIG. 9. The apparatus may include an SSB component 1012 configured to receive an SSB, e.g., as described in connection with 906 in FIG. 9. The apparatus may include an SSB occasion indication component 1014 configured to receive an indication of SSB(s) occasions from among the set of SSB occasions, e.g., as described in connection with 908 in FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
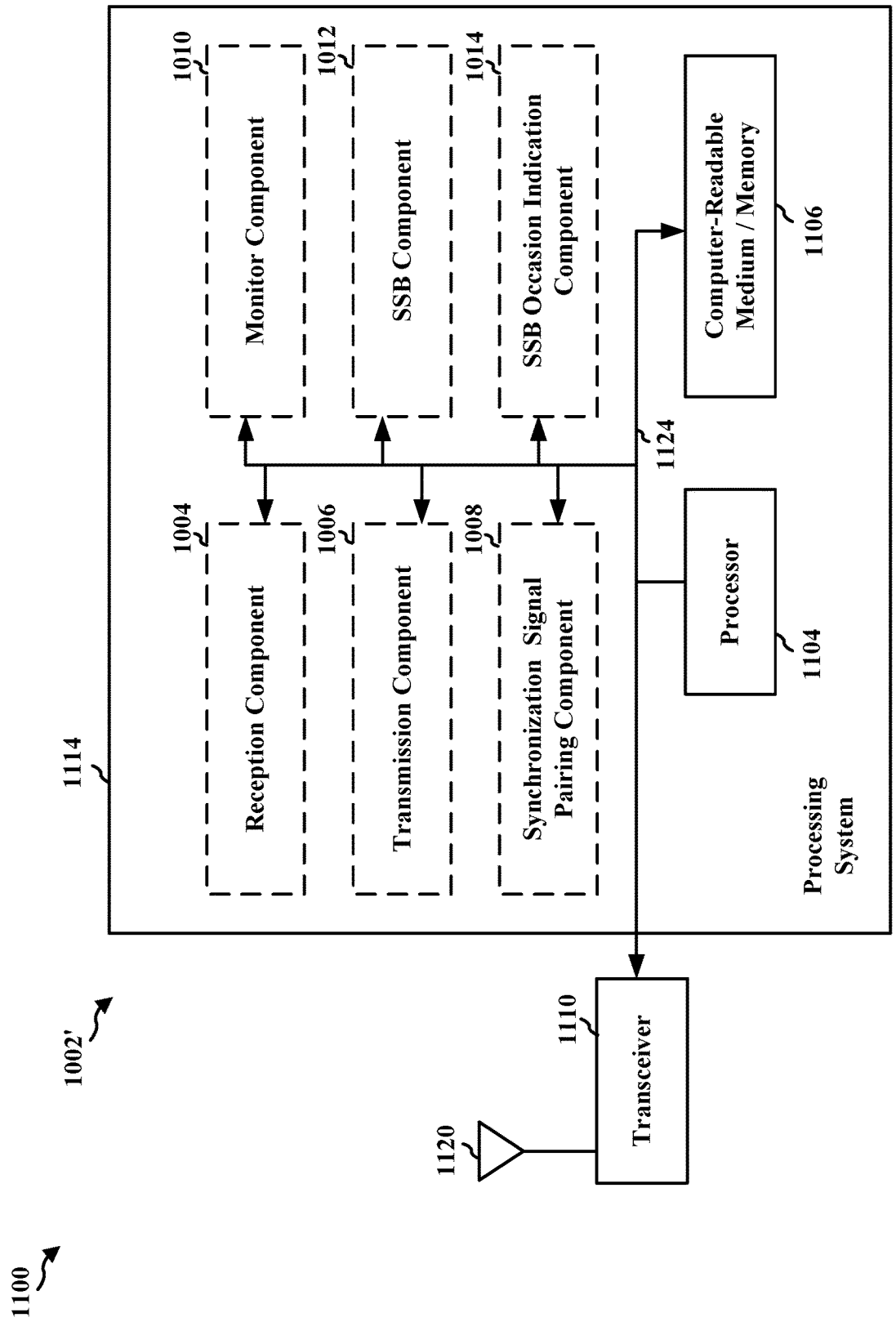
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359. Alternatively, the processing system 1114 may be the entire UE (e.g., see the UE 350 of FIG. 3).

In one configuration, the apparatus 1002/1002' for wireless communication includes means for selecting a synchronization signal pairing, wherein the synchronization signal pairing is associated with a pairing of a primary synchronization signal (PSS) and a secondary synchronization signal (SSS), wherein the synchronization signal pairing maps to a subset of synchronization signal block (SSB) occasions including SSB occasions within an SSB period. The apparatus may include means for monitoring for an SSB at each SSB occasion from the subset of SSB occasions. The apparatus may include means for receiving SSB(s). The apparatus may include means for receiving an indication of SSB occasion(s) used to transmit SSB(s), e.g., in the received SSB(s). The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method for wireless communication for a first device, comprising: selecting a subset of synchronization signal block (SSB) occasions including SSB occasions within an SSB period, and wherein the subset of SSB occasions is associated with a pairing of a primary synchronization signal (PSS) and a secondary synchronization signal (SSS); and transmitting an SSB using at least one SSB occasion from the subset of SSB occasions.

Example 2 is the method of Example 1, wherein a quantity of the SSB occasions included in the subset of SSB occasions is less than a maximum number of SSB occasions for a frequency band.

Example 3 is the method of any of Examples 1 and 2, further comprising: transmitting an indication of the at least one SSB occasion from the subset of SSB occasions, wherein the indication is comprised in a system information block (SIB) or radio resource control (RRC) message.

Example 4 is the method of any of Examples 1 to 3, wherein the indication is indicated with reference to the subset of SSB occasions.

Example 5 is the method of any of Examples 1 to 4, wherein the indication is independent of the subset of SSB occasions.

Example 6 is the method of any of Examples 1 to 5, wherein the selecting of the subset of SSB occasions is determined by the first device.

Example 7 is the method of any of Examples 1 to 6, wherein the selecting of the subset of SSB occasions is determined based on a rule received from a base station.

Example 8 is the method of any of Examples 1 to 7, wherein each SSB occasion of the subset of SSB occasions is associated with a beam characteristic.

Example 9 is the method of any of Examples 1 to 8, wherein the beam characteristic comprises at least one of a beam shape, a beam width and a beam direction.

Example 10 is the method of any of Examples 1 to 9, wherein the beam characteristic comprises the beam width and the SSB occasions included in the subset of SSB occasions are based on a beam-width threshold.

Example 11 is the method of any of Examples 1 to 10, wherein the selecting the subset of SSB occasions includes: determining a location of the first device with respect to a cell, and wherein the selecting of the subset of SSB occasions is based on the location.

Example 12 is the method of any of Examples 1 to 11, wherein when the location corresponds to an edge of the cell, the first device selects the subset of SSB occasions associated with a beam width above a beam threshold.

Example 13 is the method of any of Examples 1 to 12, wherein when the location corresponds to an edge of the cell, the first device selects the subset of SSB occasions associated with a beam direction or a beam width for serving out-of-coverage user equipment.

Example 14 is the method of any of Examples 1 to 13, wherein the subset of SSB occasions is a function of a raster point.

Example 15 is the method of any of Examples 1 to 14, wherein the subset of SSB occasions is a function of the pairing of the PSS and the SSS and of a raster point.

Example 16 is a device including one or more processors and one or more memories in electronic communication with the one or more processors storing instructions executable by the one or more processors to cause the system or apparatus to implement a method as in any of Examples 1-15.

Example 17 is a system or apparatus including means for implementing a method or realizing an apparatus as in any of Examples 1-15.

Example 18 is a non-transitory computer readable medium storing instructions executable by one or more processors to cause the one or more processors to implement a method as in any of Examples 1-15.

Example 19 is a method for wireless communication for a user equipment (UE), comprising: selecting a synchronization signal pairing, wherein the synchronization signal pairing is associated with a pairing of a primary synchronization signal (PSS) and a secondary synchronization signal (SSS), wherein the synchronization signal pairing maps to a subset of synchronization signal block (SSB) occasions including SSB occasions within an SSB period; and monitoring for an SSB at each SSB occasion from the subset of SSB occasions.

Example 20 is the method of Example 19, wherein a quantity of the SSB occasions included in the subset of SSB occasions is less than a maximum number of SSB occasions for a frequency band.

Example 21 is the method of any of Examples 19 and 20, further comprising: receiving an indication of at least one SSB occasion from the subset of SSB occasions after acquiring the SSB, wherein the indication is comprised in a system information block (SIB) or radio resource control (RRC) message.

Example 22 is the method of any of Examples 19 to 21, wherein the indication is indicated with reference to the subset of SSB occasions.

Example 23 is the method of any of Examples 19 to 22, wherein the indication is independent of the subset of SSB occasions.

Example 24 is the method of any of Examples 19 to 23, wherein each of the SSB occasions of the subset of SSB occasions is associated with a beam characteristic.

Example 25 is the method of any of Examples 19 to 24, wherein the beam characteristic comprises at least one of a beam shape, a beam-width and a beam direction.

Example 26 is the method of any of Examples 19 to 25, wherein the beam characteristic comprises the beam-width and the SSB occasions included in the subset of SSB occasions are based on a beam-width threshold.

Example 27 is the method of any of Examples 19 to 26, wherein each of the SSB occasions of the subset of SSB occasions is associated with the pairing of the PSS and the SSS and with a raster point.

Example 28 is the method of any of Examples 19 to 27, wherein the subset of SSB occasions is a function of a raster point.

Example 29 is the method of any of Examples 19 to 28, wherein the subset of SSB occasions is a function of the pairing of the PSS and the SSS and of a raster point.

Example 30 is a device including one or more processors and one or more memories in electronic communication with the one or more processors storing instructions executable by the one or more processors to cause the system or apparatus to implement a method as in any of Examples 19-29.

Example 31 is a system or apparatus including means for implementing a method or realizing an apparatus as in any of Examples 19-29.

Example 32 is a non-transitory computer readable medium storing instructions executable by one or more processors to cause the one or more processors to implement a method as in any of Examples 19-29.

What is claimed is:

1. A method of wireless communication for a first device, comprising:
    selecting a first subset of synchronization signal block (SSB) occasions from a plurality of subsets of SSB occasions, the first subset of SSB occasions including SSB occasions within an SSB period, wherein each subset of SSB occasions in the plurality of subsets of SSB occasions is associated with a respective group of synchronization signal pairings in a plurality of groups of synchronization signal pairings, each group of synchronization signal pairings in the plurality of groups of synchronization signal pairings comprise one or more synchronization signal pairings, and each synchronization signal pairing is associated with a pairing of a primary synchronization signal (PSS) and a secondary synchronization signal (SSS); and transmitting an SSB using at least one SSB occasion from the first subset of SSB occasions.

2. The method of claim 1, wherein a quantity of the SSB occasions included in the first subset of SSB occasions is less than a maximum number of SSB occasions for a frequency band.

3. The method of claim 1, further comprising:
transmitting an indication of the at least one SSB occasion from the first subset of SSB occasions, wherein the indication is comprised in a system information block (SIB) or radio resource control (RRC) message.

4. The method of claim 3, wherein the indication is indicated with reference to the first subset of SSB occasions.

5. The method of claim 3, wherein the indication is independent of the first subset of SSB occasions.

6. The method of claim 1, wherein the selecting of the first subset of SSB occasions is determined by the first device.

7. The method of claim 1, wherein the selecting of the first subset of SSB occasions is determined based on a rule received from a base station.

8. The method of claim 1, wherein each SSB occasion of the first subset of SSB occasions is associated with a beam characteristic.

9. The method of claim 8, wherein the beam characteristic comprises at least one of a beam shape, a beam width and a beam direction.

10. The method of claim 9, wherein the beam characteristic comprises the beam width and the SSB occasions included in the first subset of SSB occasions are based on a beam-width threshold.

11. The method of claim 1, wherein the selecting the first subset of SSB occasions includes:
determining a location of the first device with respect to a cell,
wherein the selecting of the first subset of SSB occasions is based on the location.

12. The method of claim 11, wherein when the location corresponds to an edge of the cell, the first device selects the first subset of SSB occasions associated with a beam width above a beam threshold.

13. The method of claim 11, wherein when the location corresponds to an edge of the cell, the first device selects the first subset of SSB occasions associated with a beam direction or a beam width for serving out-of-coverage user equipment.

14. The method of claim 1, wherein the first subset of SSB occasions is a function of a raster point.

15. The method of claim 1, wherein the first subset of SSB occasions is a function of the pairing of the PSS and the SSS and of a raster point.

16. A method of wireless communication for a user equipment (UE), comprising:
selecting a synchronization signal pairing, wherein the synchronization signal pairing is associated with a pairing of a primary synchronization signal (PSS) and a secondary synchronization signal (SSS), wherein the synchronization signal pairing is included in a first group of synchronization signal pairings in a plurality of groups of synchronization signal pairings, each group of synchronization signal pairings in the plurality of groups of synchronization signal pairings comprise one or more synchronization signal pairings, each group of synchronization signal pairings in the plurality of groups of synchronization signal pairings map to a respective subset of synchronization signal block (SSB) occasions in a plurality of subsets of SSB occasions, and the first group of synchronization signal pairings map to a first subset of SSB occasions in the plurality of subsets of SSB occasions, the first subset of SSB occasions including SSB occasions within an SSB period; and
monitoring for an SSB at each SSB occasion from the first subset of SSB occasions.

17. The method of claim 16, wherein a quantity of the SSB occasions included in the first subset of SSB occasions is less than a maximum number of SSB occasions for a frequency band.

18. The method of claim 16, further comprising:
receiving an indication of at least one SSB occasion from the first subset of SSB occasions after acquiring the SSB, wherein the indication is comprised in a system information block (SIB) or radio resource control (RRC) message.

19. The method of claim 18, wherein the indication is indicated with reference to the first subset of SSB occasions.

20. The method of claim 18, wherein the indication is independent of the first subset of SSB occasions.

21. The method of claim 16, wherein each of the SSB occasions of the first subset of SSB occasions is associated with a beam characteristic.

22. The method of claim 21, wherein the beam characteristic comprises at least one of a beam shape, a beam-width and a beam direction.

23. The method of claim 22, wherein the beam characteristic comprises the beam-width and the SSB occasions included in the first subset of SSB occasions are based on a beam-width threshold.

24. The method of claim 16, wherein each of the SSB occasions of the first subset of SSB occasions is associated with the pairing of the PSS and the SSS and with a raster point.

25. The method of claim 16, wherein the first subset of SSB occasions is a function of a raster point.

26. The method of claim 16, wherein the first subset of SSB occasions is a function of the pairing of the PSS and the SSS and of a raster point.

27. An apparatus for wireless communication at a first device, comprising:
a memory; and
at least one processor coupled to the memory and configured to:
select a first subset of synchronization signal block (SSB) occasions from a plurality of subsets of SSB occasions, the first subset of SSB occasions including SSB occasions within an SSB period, wherein the each subset of SSB occasions in the plurality of subsets of SSB occasions is associated with a respective group of synchronization signal pairings in a plurality of groups of synchronization signal pairings, each group of synchronization signal pairings in the plurality of groups of synchronization signal pairings comprise one or more synchronization signal pairings, and each synchronization signal pairing is associated with a pairing of a primary synchronization signal (PSS) and a secondary synchronization signal (SSS); and
transmit an SSB using at least one SSB occasion from the first subset of SSB occasions.

28. The apparatus of claim 27, wherein the at least one processor is further configured to:
transmit an indication of the at least one SSB occasion from the first subset of SSB occasions, wherein the indication is comprised in a system information block (SIB) or radio resource control (RRC) message.

29. An apparatus of wireless communication for a user equipment (UE), comprising:
- a memory; and
- at least one processor coupled to the memory and configured to:
  - selecting a synchronization signal pairing, wherein the synchronization signal pairing is associated with a pairing of a primary synchronization signal (PSS) and a secondary synchronization signal (SSS), wherein the synchronization signal pairing is included in a first group of synchronization signal pairings in a plurality of groups of synchronization signal pairings, each group of synchronization signal pairings in the plurality of groups of synchronization signal pairings comprise one or more synchronization signal pairings, each group of synchronization signal pairings in the plurality of groups of synchronization signal pairings map to a respective subset of synchronization signal block (SSB) occasions in a plurality of subsets of SSB occasions, and the first group of synchronization signal pairings map to a first subset of SSB occasions in the plurality of subsets of SSB occasions, the first subset of SSB occasions including SSB occasions within an SSB period; and
  - monitoring for an SSB at each SSB occasion from the first subset of SSB occasions.

30. The apparatus of claim 29, wherein the at least one processor is further configured to:
- receive an indication of at least one SSB occasion from the first subset of SSB occasions after acquiring the SSB, wherein the indication is comprised in a system information block (SIB) or radio resource control (RRC) message.

\* \* \* \* \*